United States Patent
Olsson et al.

(10) Patent No.: US 9,144,050 B2
(45) Date of Patent: Sep. 22, 2015

(54) METHODS AND APPARATUS FOR USE IN A COMMUNICATIONS NETWORK

(75) Inventors: Magnus Olsson, Stockholm (SE); Göran Hall, Molndal (SE); Magnus Hallenstal, Taby (SE); Ralf Keller, Wurselen (DE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 522 days.

(21) Appl. No.: 13/516,436

(22) PCT Filed: Dec. 17, 2009

(86) PCT No.: PCT/EP2009/067463
§ 371 (c)(1),
(2), (4) Date: Aug. 20, 2012

(87) PCT Pub. No.: WO2011/072747
PCT Pub. Date: Jun. 23, 2011

(65) Prior Publication Data
US 2012/0307732 A1    Dec. 6, 2012

(51) Int. Cl.
*H04W 64/00* (2009.01)
*H04W 8/08* (2009.01)
*H04W 68/00* (2009.01)
*H04W 88/06* (2009.01)

(52) U.S. Cl.
CPC ............... *H04W 64/00* (2013.01); *H04W 8/08* (2013.01); *H04W 68/00* (2013.01); *H04W 88/06* (2013.01)

(58) Field of Classification Search
CPC ........... H04W 8/10; H04W 8/12; H04W 8/14; H04W 8/085; H04W 72/048; H04W 64/00
USPC ............................................ 370/328, 331, 389
See application file for complete search history.

(56) References Cited

U.S. PATENT DOCUMENTS

| 2002/0042277 A1 | 4/2002 | Smith |
| 2004/0043774 A1 | 3/2004 | Lee |
| 2010/0039987 A1* | 2/2010 | Hegde et al. .................. 370/328 |

(Continued)

FOREIGN PATENT DOCUMENTS

| EP | 2099247 A1 | 9/2009 |
| WO | 0235752 A2 | 5/2002 |

OTHER PUBLICATIONS

Zte, "Discussion on voice domain selection for terminating call and ISR", 3GPP TSG SA WG2 #76, San Jose Del Cabo, Mexico, Nov. 16-20, 2009, TD S2-096818, Agenda Item, 06.6, 5 pages.

(Continued)

*Primary Examiner* — Andrew Lai
*Assistant Examiner* — Chuong M Nguyen
(74) *Attorney, Agent, or Firm* — Rothwell, Figg, Ernst & Manbeck, P.C.

(57) ABSTRACT

According to a first aspect of the present invention there is provided a method of operating a mobility management node to provide location and/or status information for a user terminal connected to an Evolved Packet Core network. The method comprises receiving a request for location and/or status information for the user terminal from a subscriber register, determining the location and/or status information for the user terminal, and sending a response to the subscriber register including the determined location and/or status information.

15 Claims, 6 Drawing Sheets

(56) References Cited

U.S. PATENT DOCUMENTS

2010/0124223 A1* 5/2010 Gibbs et al. .................... 370/389
2011/0142006 A1* 6/2011 Sachs ........................... 370/331
2012/0079082 A1* 3/2012 Ding et al. .................... 709/220

OTHER PUBLICATIONS

Zte, "Idle mode Signalling Reduction description", 3GPP TSG SA WG2, Meeting #59, Helsinki, Finland, Aug. 27-31, 2007, TD S2-073506, Agenda Item 8.2.8, 1 page.
Japanese Office Action issued in JP 2012-543486, dated Nov. 1, 2013, 3 pages.
3 GPP: "3 GPP TS 23.271 v9.1.0: Technical Specification Group Services and System Aspects; Functional Stage 2 Description of Location Services (LCS) (Release 9)", European Telecommunications Standards Institute (ETSI), 650, Route Des Lucioles, F-06921 Sophia-Antipolis, France, Sep. 30, 2009, pp. 1-166, XP002601495.
3GPP, "3rd Generation Partnership Project; Technical Specification Group Services and System Aspects; General Packet Radio Service (GPRS)enhancements for Evolved Universal Terrestrial Radio Access Network (E-UTRAN) access (Release 8)", 3GPP TS 23.401 V8.2.0, Jun. 2008, 182 pages.
3GPP, "3rd Generation Partnership Project; Technical Specification Group Services and System Aspects; Functional stage 2 description of Location Services (LCS) (Release 9)"; 3GPP TS 23.271, v 9.1.0, Sep. 2009, 166 pages.
European Office Action from corresponding application No. EP09802131.4, dated Jan. 16, 2015, 7 pages.

* cited by examiner

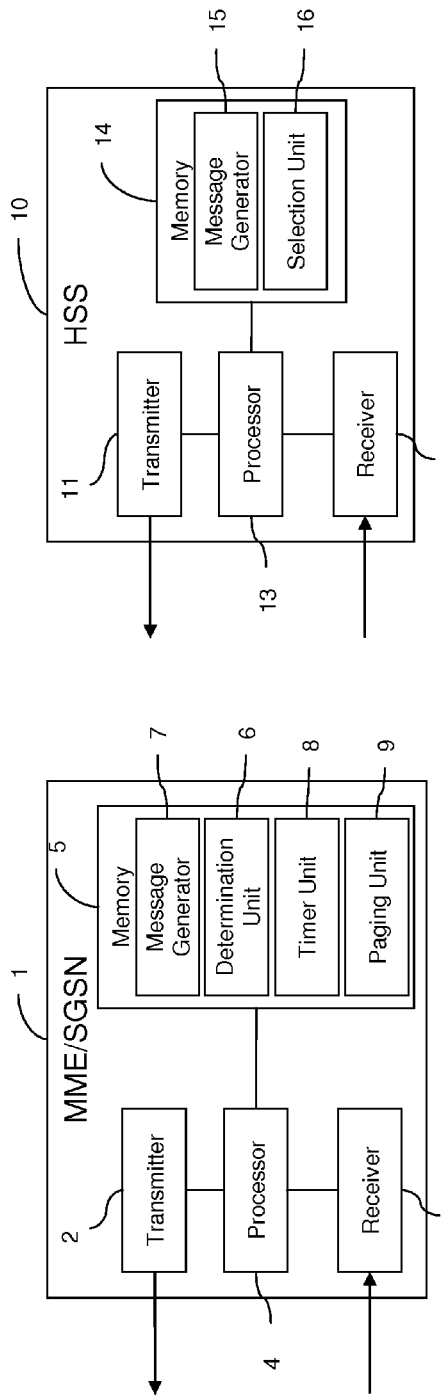
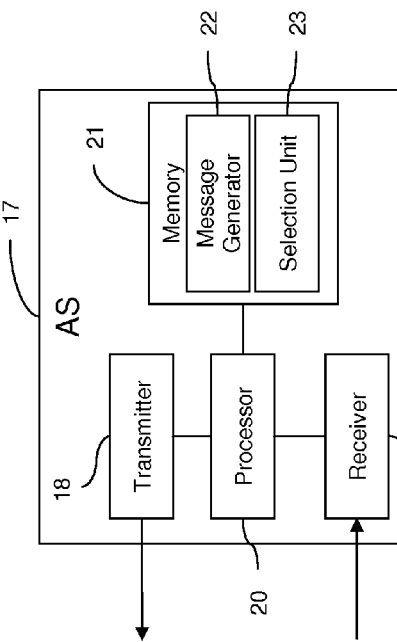
Figure 6
Figure 7
Figure 8

METHODS AND APPARATUS FOR USE IN A COMMUNICATIONS NETWORK

CROSS-REFERENCE TO RELATED APPLICATION

This application is a 35 U.S.C. §371 National Phase Entry Application from PCT/EP2009/067463 filed Dec. 17, 2009, and designating the United States.

TECHNICAL FIELD

The present invention relates to methods and apparatus for use in a communications network. More particularly, the invention relates to a methods and apparatus for obtaining status and/or location information for a user terminal connected to an Evolved Packet Core network.

BACKGROUND

Long Term Evolution (LTE) technology, introduced in 3GPP Release 8, is the next major step in mobile radio communications. It will give a superior user experience and support even more demanding applications, such as interactive TV, user-generated videos, advanced games, and professional services. LTE uses OFDM (orthogonal frequency-division multiplexing) radio access technology together with advanced antenna technologies.

FIG. 1 illustrates the LTE system architecture, including an E-UTRAN radio access network and an Evolved Packet Core (EPC) network. The E-UTRAN consists of eNodeBs (not shown), which provide the radio interface toward the User Equipment (UE). The eNodeBs are interconnected with each other via the IP-based X2 interface and toward the EPC by the IP-based S1 interfaces. The EPC comprises the Serving Gateway (SGW), the Mobility Management Entity (MME), the Packet Data Network Gateway (PDN GW), and the Policy Charging Rules Function (PCRF). Unlike the 3G architecture, EPC does not reuse the Home Location Register (HLR). Rather, a Home Subscriber Server (HSS) replaces the subscriber register functionality of the HLR in the EPC. In addition, a Serving GPRS Support Node (SGSN) acts as a mobility server or mobility management node for user terminals accessing the EPC via legacy radio access technologies such as a GERAN (2G) or UTRAN (3G).

The SGW sits in the user plane where it forwards and routes packets to and from the eNodeB and the PDN GW. The SGW also serves as the local mobility anchor for inter-eNodeB handover and roaming between two 3GPP systems. For a UE in idle mode, the SGW is responsible for terminating the down-link data path and when down-link data is received, buffering the data and triggering a paging procedure by signalling the MME over the S11 interface.

The MME is the control-plane function for E-UTRAN access. The MME manages states (attach, detach, idle, RAN mobility), authentication, paging, mobility with 3GPP 2G/3G nodes (such as the SGSN), roaming and other bearer management functions. It is responsible for authentication and critical management for mobile devices as well as for tracking and paging procedures for UEs in idle mode. The MME authorizes bearer activation/deactivation including SGW and PDN gateway selection. Like the SGSN, the MME maintains a knowledge of the current location of a subscriber on the cell level, and acts as a mobility server or mobility management node. The MME is connected to the E-UTRAN by the S1-MME interface, and to the HSS by the S6a interface.

The PDN GW acts as the interface between the LTE network and the Packet Data Networks (PDNs), such as the Internet or SIP-based IP Multimedia Subsystem (IMS) networks (fixed and mobile). The PDN GW is the mobility anchor point for intra-3GPP access system mobility and for mobility between 3GPP access systems and non-3GPP access systems. The PDN GW performs IP policy and charging enforcement on packet flows to and from mobile devices. The PDN GW is responsible for IP address allocation, charging, deep packet inspection, lawful intercept, policy enforcement and other services.

In order to allow LTE subscribers to make use of 2G/3G services (e.g. in geographic locations where LTE is not available), seamless mobility between the different radio access technologies (RAT) should be available. A function known as Idle mode Signalling Reduction (ISR), specified in 3GPP TS 23.401, provides a mechanism to limit signalling during inter-radio access technology (inter-RAT) cell reselection (i.e. a handover between a 2G/3G RAT and a LTE RAT) when a UE is in Idle mode.

UEs that are currently participating in an active session (data or voice) are said to be in active mode. In active mode, the network knows the exact cell in which the UE is located. When the UE is not performing an active data transfer, it is said to be in idle mode. In idle mode, the network does not know the exact cell in which the UE is currently camping. Instead it knows the location of the cell only to the granularity of a group of cells (e.g. a Routing Area or Tracking Area). Therefore, in idle mode the network needs to page the UE in all the cells in this group in order to deliver UE-terminated data.

The ISR mechanism allows the UE to remain simultaneous registered in both an UTRAN/GERAN Routing Area (RA) and an E-UTRAN Tracking Area (TA) list. This allows the UE to make cell reselections between E-UTRAN and UTRAN/GERAN without a need to send any TA Update (TAU) or RA Update (RAU) requests, as long as it remains within the registered RA and TA list. For example, when a UE moves from an SGSN to an MME, the MME sends a Diameter Update Location Request message to the HSS indicating that ISR applies. Consequently, the HSS does not send a Cancel Location Request message to the SGSN. When the user moves back to the SGSN and ISR applies, the SGSN does not send a MAP Update GPRS Location message to the HSS (over the Gr interface). Maintaining 2G/3G bearers for a relatively short period will consume fewer network resources than would be consumed when performing frequent inter-RAT handovers. Such functionality is desirable as it is expected that, at least in the initial rollout phase, LTE access will be limited to relatively small "hot spots" and as such inter-RAT handovers will be frequent.

When ISR is activated this means the UE is registered with both MME and SGSN. Both the SGSN and the MME have a control connection with the Serving GW and are both registered at HSS. The UE stores Mobility Management (MM) parameters from the SGSN (e.g. P-TMSI and RA) and from the MME (e.g. GUTI and TA(s)) and session management (bearer) contexts that are common for E-UTRAN and GERAN/UTRAN accesses. In idle state the UE can reselect between E-UTRAN and GERAN/UTRAN (within the registered RA and TAs) without any need to perform TAU or RAU procedures with the network. In addition, the SGSN and the MME store each other's address when ISR is activated. However, ISR does create more complex paging procedures for UEs for which ISR is active, as there is then a need to page the UE on both the registered RA and all registered TAs. For example, when downlink data arrives that is destined for a UE for which ISR is activated (and the UE is in idle mode), the Serving GW initiates paging processes on both the SGSN and the MME. Similarly, when the HSS receives a request for the current location of a UE for which ISR is activated, it will not know which of the two possible accesses the UE is using, and will therefore need to request that both the SGSN and the MME page the UE. The UE will then only respond from the radio access network on which it is currently camped.

This simultaneous "double registration" of the UE with both the MME and the SGSN has been included within 3GPP Release as a means to support ISR. However, there may be additional situations in which a double registration may occur, even though ISR is not in use. For example, when a UE switches from a UTRAN/GERAN to an E-UTRAN the HSS may not be informed of the change in access, such that the HSS has registrations pointing at both a MME and a SGSN for that UE, even if ISR is not in use.

These double registrations can also create problems in scenarios in which an application server (AS) requests the location and/or status information of a UE. In these scenarios the HSS can not determine which of the two registrations is the most recent. In addition, if a UE which has a double registration changes between an LTE access and a 2G/3G access, and provided the change is between the same MME-SGSN pair, then the HSS will not be notified about this access change. As such, the information that the requesting AS receives from the HSS may not be accurate, and may therefore cause the AS to initiate a location or status information request which may be sent to the wrong mobility management node (i.e. MME/SGSN).

For example, in order to provide Location Services (LCS) in the case of a Mobile Terminated Location Request (MT-LR), a Gateway Mobile Location Centre (GMLC) issues a request towards the HSS via the Lh interface for the identity of the mobility management node at which the UE is currently registered. However, if a UE has a double registration with both an SGSN and an MME, then the HSS will respond with a list including the identities of both the SGSN and the MME. As such, the GMLC will not know to which of the two nodes it should send the request for the UE's location (even though the HSS, as an implementation option, can set one of the mobility management nodes as the "main entity").

In addition, both SMS and CS telephony in 2G/3G require the Charging Data Records (CDRs) to include a network validated Cell ID. This Cell ID may be used for charging purposes but may also be necessary to meet regulatory requirements. However, for similar applications in an LTE system, such as SMS over IP and MMTel, if the UE is registered with both the MME and SGSN and in idle mode, then the Cell ID sent in the last update to the HSS may well not be the current Cell ID. As such, the Cell ID provided by the HSS to application servers supporting such services may well be inaccurate.

By way of further example, in some networks there are third party application services that make use of the Any Time Interrogation (ATI) feature of the Customised Applications for Mobile network Enhanced Logic (CAMEL) standard. This ATI process enables a GSM Service Control Function (gsmSCF) to interrogate a HLR, or an IP Multimedia Service Switching Function (IM-SSF) to interrogate a HSS (on behalf of a gsmSCF), for location and or subscriber information. As such, these applications are typically interested in the location (e.g. Cell ID) and the status (i.e. idle or active) of the UE. However, if an AS such as an IM-SSF requests information relating to a UE that has a double registration, then the HSS may respond with information that is not accurate. For example, the HSS may indicate that a UE is visiting an MME, as this is configured within the HSS as the main entity, when the UE is in fact located at an SGSN.

Furthermore, for voice services in LTE networks there is currently no mechanism that allows the network to know whether a UE is in an access (typically LTE) where MMTel based voice services can be used or whether a voice call should be directed to a circuit-switched (CS) access (typically 2G/GSM). According to current network functionality, for a Mobile Terminated (MT) call, the Terminating Access Domain Selection (T-ADS) function of the Service Consistency and Continuity (SCC) AS would try to set up an MMTel call over the PS access (typically LTE access). Then, if the UE is in a 2G access network, the SIP INVITE will have to be routed all the way to the UE over the 2G packet-switched (PS) access. As the UE will not have support for Voice over IMS in the 2G access network, it will then have to respond rejecting the INVITE. Upon receiving the rejection the SCC AS will then have to contact the MSC in order to set up a CS call. This leads to a long call setup time when a UE is visiting in a 2G access of a multi-access network (i.e. GSM and/or UMTS radio access networks together with an LTE radio access network).

SUMMARY

It is an object of the present invention to overcome, or at least mitigate the problems identified above. This object is achieved by defining a procedure for obtaining (or "pulling") information relating to a UE with a double registration from the HSS in an Evolved Packet Core network.

According to a first aspect of the present invention there is provided a method of operating a mobility management node to provide location and/or status information for a user terminal connected to an Evolved Packet Core network. The method comprises receiving a request for location and/or status information for the user terminal from a subscriber register, determining the location and/or status information for the user terminal, and sending a response to the subscriber register including the determined location and/or status information.

The step of determining the location and/or status information for the user terminal may comprise using the most recent update of the user terminals location and/or status information. Alternatively, the step of determining the location and/or status information for the user terminal may comprise determining if the user terminal is in active mode or idle mode. If the user terminal is in active mode, then the response sent to the subscriber register includes the latest status and/or location information received from the user terminal. However, if the user terminal is in idle mode, the step of determining the location and/or status information for the user terminal may further comprise one or more of:
  waiting for activation of the user terminal in order to receive the location and/or status information;
  using the most recent update of the user terminals location and/or status information; and
  paging the user terminal for the location and/or status information.

The step of waiting for activation of the user terminal may comprise determining if the user terminal is activated within a specified time limit and, if so, using the location and/or status information from the activation of the user terminal. However, if the user terminal is not activated within the specified time limit, the step of determining the location and/or status information for the user terminal may further comprise one or more of:

using the most recent update of the user terminals location and/or status; and paging the user terminal for the location and/or status information.

The step of using the most recent update of the user terminals location and/or status may comprise determining if the age of the location and/or status information held by the mobility management node exceeds a specified threshold and, if not, using the user terminals location and/or status information held by the mobility management node. However, if the age of the location and/or status information held by the mobility management node exceeds a specified threshold, the step of determining the location and/or status information for the user terminal may further comprise:

paging the user terminal for the location and/or status information.

If the most recent update of the user terminals location and/or status information is used, then the response sent to the subscriber register includes an indication of the time of or the time since the last update from the user terminal.

The mobility management node may be a Mobility Management Entity (MME) and the radio access technology may be an Evolved UMTS Terrestrial Radio Access Network (E-UTRAN). Alternatively, the mobility management node may be a Serving GPRS Support Node (SGSN) and the radio access technology may be a GSM Edge Radio Access Network (GERAN) or a UMTS Terrestrial Radio Access Network, (UTRAN). The subscriber register may be a Home Subscriber Server (HSS).

According to a second aspect of the present invention there is provided a method of operating a subscriber register to obtain location and/or status information for a user terminal connected to an Evolved Packet Core network, the user terminal being registered with a first mobility management node in a first radio access technology and a second mobility management node in a second radio access technology. The method comprises receiving a request for location and/or status information for the user terminal from an application server, sending a request for location and/or status information for the user terminal to both the first mobility management node and the second mobility management node, receiving a response from the first mobility management node and/or the second mobility management node, the responses including the requested information, and sending the requested information received from the first mobility management node and/or the second mobility management node to the application server.

The method may further comprise, if the requested information is received from both the first mobility management node and the second mobility management node, applying selection logic to determine if the information received from the first mobility management node or the information received from the second mobility management node should be sent to the application server, and sending only the selected information to the application server. If the requested information includes an indication of the time of or the time since the last update from the user terminal, then the selection logic may comprise selecting the most recent information.

The location and/or status information may comprise one or more of:

an identifier for the cell or service area in which the user terminal is located;

an indication of whether or not Voice over IP services are available for the user terminal;

an indication of whether the user terminal is idle or active; and an indication of whether or not idle signalling mode reduction is activate for the user terminal.

The first mobility management node may be a Mobility Management Entity (MME), and the first radio access technology may be an Evolved UMTS Terrestrial Radio Access Network (E-UTRAN). The second mobility management node may be a Serving GPRS Support Node (SGSN), and the second radio access technology may be a GSM Edge Radio Access Network (GERAN) or a UMTS Terrestrial Radio Access Network (UTRAN).

According to a third aspect of the present invention there is provided a method of operating an application server to determine the location and/or status information for a user terminal connected to an Evolved Packet Core network. The method comprises sending a request for location and/or status information for a user terminal to a subscriber register, receiving a response from the subscriber register, the response including a first set of location and/or status information and a second set of location and/or status information, and applying selection logic to determine which of the first set and second set should be used.

If the first and second sets of location and/or status information both include an indication of the age of the information, then the selection logic may comprise selecting the most recent information.

If the user terminal is registered with a first mobility management node in a first radio access technology and a second mobility management node in a second radio access technology, then the first set may be information that was retrieved from the first mobility management node and the second set may be information that was retrieved from the second mobility management node.

The application server may comprise any one of:

an IP Multimedia Subsystem Charging application server;

a Service Control Point;

a Service Centralization and Continuity application server; and a Gateway Mobile Location Centre.

According to a fourth aspect of the present invention there is provide an apparatus configured to operate as a mobility management node connected to an Evolved Packet Core network. The apparatus comprises a receiver for receiving a request for location and/or status information for the user terminal from a subscriber register, a processor for determining the location and/or status information for the user terminal and for generating a response to the subscriber register including the determined location and/or status information, and a transmitter for sending a response to the subscriber register including.

When determining the location and/or status information for the user terminal, the processor may be configured to use the location and/or status information received in the most recent update from the user terminal. Alternatively, the processor may be configured to determine if the user terminal is in active mode or idle mode. If the user terminal is in active mode, then the processor may use the latest location and/or status information received from the user terminal. However, if the user terminal is in idle mode, then the processor may be configured to perform one or more or wait for activation of the user terminal in order to receive the location and/or status information;

use the most recent update of the user terminals location and/or status information; and generate a paging message for sending to the user terminal in order to obtain the location and/or status information.

When waiting for activation of the user terminal, the processor may be further configured to determine if the user terminal is activated within a specified time limit and, if so, then to use the location and/or status information from the activation of the user terminal. However, when it is determined that the user terminal is not activated within the specified time limit, the processor may be further configured to perform one or more of:

use the most recent update of the user terminals location and/or status information; and generate a paging message for sending to the user terminal in order to obtain the location and/or status information.

When using the most recent update of the user terminals location and/or status information, the processor may be further configured to determine if the age of the location and/or status information held by the mobility management node exceeds a specified threshold and, if not, then to use the user terminals location and/or status information held by the mobility management node. However, when it is determined that the age of the location and/or status information held by the mobility management node exceeds the specified threshold, the processor may be further configured to generate a paging message for sending to the user terminal in order to obtain the location and/or status information. If so, the apparatus may further comprise a further transmitter for sending the paging message to the user terminal, and a further receiver for receiving a paging response from the user terminal.

When using the most recent update of the user terminals location and/or status information, the processor may be further configured to include an indication of the time of or the time since the last update received from the user terminal in the response to the subscriber register.

According to a fifth aspect of the present invention there is provided an apparatus configured to operate as a subscriber register for obtaining location and/or status information for a user terminal connected to an Evolved Packet Core Network, the user terminal being registered with a first mobility management node in a first radio access technology and a second mobility management node in a second radio access technology. The apparatus comprises:

a first receiver for receiving a request for location and/or status information for the user terminal from an application server, a processor for generating a first message for sending to the first mobility management node and a second message for sending to the second mobility management node, the first and second messages requesting location and/or status information for the user terminal;

a first transmitter for sending the first message to the first mobility management node and the second message to the second mobility management node;

a second receiver for receiving a response from the first mobility management node and/or the second mobility management node, the responses including the requested information; and a second transmitter for sending the requested information received from the first mobility management node and/or the second mobility management node to the application server.

If the requested information is received from both the first mobility management node and the second mobility management node, the processor may be further configured to apply selection logic to determine if the information received from the first mobility management node or the information received from the second mobility management node should be sent to the application server.

According to a sixth aspect of the present invention there is provided an apparatus configured to operate as an application server for determining the location and/or status information for a user terminal connected to an Evolved Packet Core Network. The apparatus comprises a transmitter for sending a request for location and/or status information for a user terminal to a subscriber register, a receiver for receiving a response from the subscriber register, the response including a first set of location and/or status information and a second set of location and/or status information, and a processor for applying selection logic to determine which of the first set and second set should be used.

If the first and second sets of location and/or status information both include an indication of the age of the information, then the selection logic may comprise selecting the most recent information.

BRIEF DESCRIPTION OF THE DRAWINGS

FIG. 6 illustrates schematically an example of a MME/SGSN according to an embodiment of the present invention;

FIG. 7 illustrates schematically an example of a HSS according to an embodiment of the present invention; and FIG. 8 illustrates schematically an example of an AS according to an embodiment of the present invention.

DETAILED DESCRIPTION

There will now be described a method of obtaining information relating to a UE connected to an Evolved Packet Core network. In particular, this method enables a subscriber register, such as a Home Subscriber Server, to obtain location and/or status information for a user terminal which is registered with both an MME and an SGSN. This method involves the HSS, sending a request for the location and/or status of the user terminal to both the MME and the SGSN at which the user terminal is registered. Both the MME and the SGSN will then attempt to determine the location and/or status of the user terminal in accordance with the request from the HSS. The location information may comprise the Cell ID or Service Area ID, whilst the status information may comprise an indication of whether the user terminal is in active mode or idle mode or information regarding the availability of certain services to the user terminal, such as Voice over IMS.

If the UE is in active mode then both the MME and the SGSN will be able to provide the most recent location and/or status information received from the UE, which will usually be accurate. However, if the UE is in idle mode then the location and/or status information received in the most recent update from the UE, and currently held by the MME/SGSN, may not be accurate. As such, when the UE is in idle mode, in order to determine the location and/or status information of the UE, the MME and the SGSN can perform one or more of the following:

wait for the UE to be activated in order to receive the location and/or status information from the UE;

re-use the location and/or status information received in the most recent update received from the UE; and page the UE in order to receive the latest location and/or status information for the UE.

Figure 1:
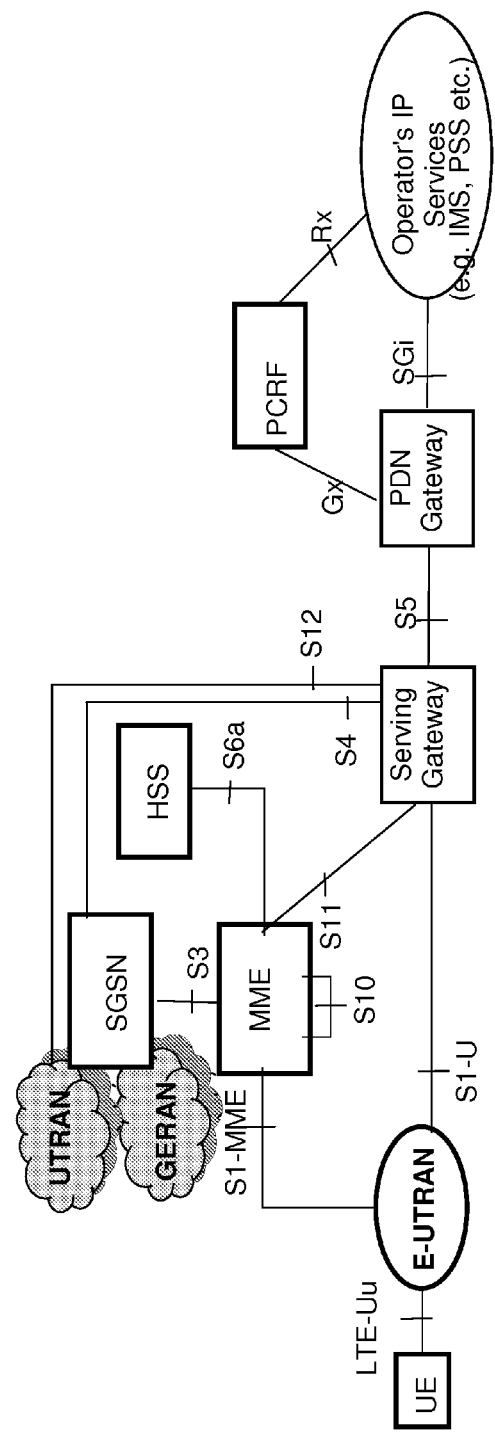
FIG. 1 illustrates schematically the LTE system architecture.
Figure 2:
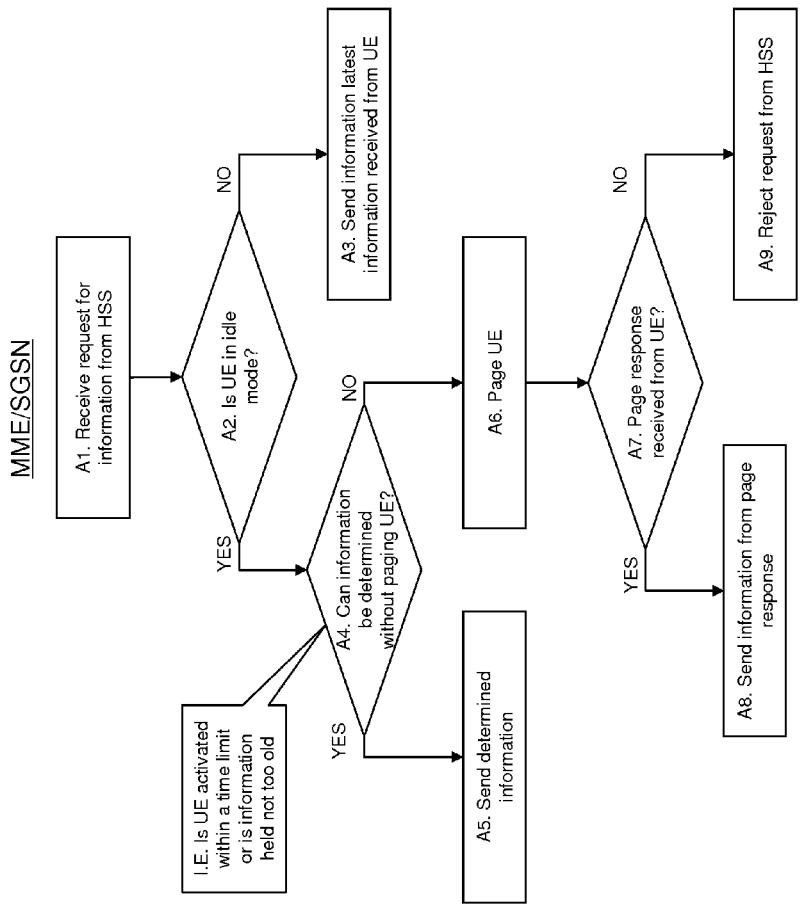
FIG. 2 illustrates a simplified flow diagram of the process of determining the location and/or status information of a UE with a double registration according to an embodiment of the present invention.

The MME and/or SGSN can be configured to perform any one of these procedures in order to determine the status and/or location of the UE. Alternatively, the MME and/or SGSN can be configured to perform a combination of any of these procedures as and when required. For example, FIG. 2 illustrates the simplified process of determining the location and/or status information of a UE with a double registration. Upon receiving a request for status and/or location information for the UE (A1), then either or both the MME and the SGSN could be configured to determine if the UE is in idle mode (A2). If the UE is not in idle mode (i.e. the UE is active) then the MME/SGSN could send the latest information received during the activity of the UE (A3). However, if the UE is in idle mode then the MME/SGSN could attempt to determine the requested information without paging the UE (A4). This could be achieved by waiting for a pre-defined time period to see if the UE is activated. If the UE is activated within this time period then the MME/SGSN would be updated with the latest status and location information for the UE which it could then send to the HSS (A5). If this time period expires and the UE has not been activated, then the MME/SGSN could be configured to determine if the age of the most recent location and/or status information that it holds for the UE exceeds a pre-defined threshold. If the age of the most recent information does not exceed this threshold, then the MME/SGSN could be configured to assume this information is accurate, and therefore treat this information as current and send this to the HSS (A5). However, if the age of the most recent information exceeds this threshold, such that it is considered too old to be re-used, then the MME/SGSN could page the UE in order to obtain the latest location and/or status information for the UE (A7).

Performing these procedures one after the other in this manner would ensure that signalling is minimised, as the MME/SGSN would only page the UE if suitably accurate information could not be obtained in any other practical manner. Of course, only one of these procedures in step A4 could be performed or both steps could be performed in reverse order.

Figure 3:
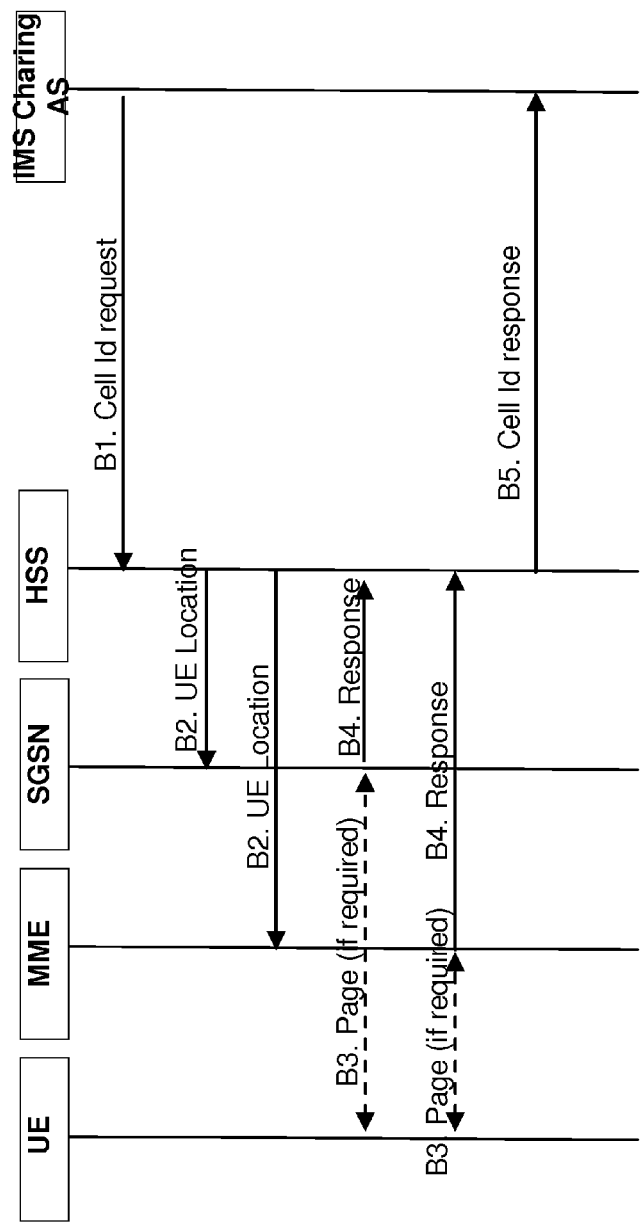
FIG. 3 illustrates an example signalling flow diagram of a method of obtaining user terminal location information according to an embodiment of the present invention.

FIG. 3 illustrates a simplified signalling flow diagram of an AS requesting and receiving location information, in the form of the Cell ID of the cell on which the UE is currently camped, according to the method outlined above. The steps performed are as follows:

B1. An AS (e.g. IMS Charging AS) sends to the HSS a request for the Cell ID of the cell in which a particular subscriber's UE is currently located. The request includes an identity of the subscriber (e.g. the subscriber's IMSI) or an identity of the UE (e.g. the IMEI).

B2. In this example, both a MME and an SGSN are registered at the HSS for the UE identified from the identity provided in the request. As such, the HSS sends a request for information to both the MME and the SGSN at which the UE is registered.

B3. Upon receiving the request from the HSS, then both the MME and the SGSN will determine if the UE is an active or idle mode. If the UE is in active mode then the MME and the SGSN will determine the Cell ID to be that received in the most recent update from the UE. However, if the UE is in idle mode then the MME and the SGSN will determine the location information according to one or more of the procedures outlined above. For example, the MME and/or the SGSN can wait to see if the UE will be activated and/or check the age of the most recent information they hold. Alternatively, or if neither of the other procedures are successful, then the MME and/or the SGSN can page the UE. If the MME and/or the SGSN do page the UE, then the UE will only respond to a page from the node associated with the radio access technology on which it is currently camped.

B4. Once the MME and the SGSN have attempted to determine the current Cell ID for the UE, then each node will send a response to the HSS. The responses from the MME and the SGSN may also include a timestamp indicating the time at which the information was received from the UE together with an indication of the ISR status of the UE (i.e. is ISR activated or deactivated). If either the MME or the SGSN have unsuccessfully attempted to page the UE, then this node will respond by rejecting the request from the HSS.

B5. If the HSS receives the requested information from either the MME or the SGSN, and not from both, then the HSS will send the received Cell ID to the AS. If the HSS receives the requested information from both the MME and SGSN, then the HSS can then apply some predefined logic in order to determine which information it should send in the response to the AS. Alternatively, the HSS can send both the information received from the MME and the information received from the SGSN to the AS. The AS would then apply some pre-defined logic in order to determine which set of information it should use. The logic applied by either the HSS or AS to determine which information should be used could, for example, require that the information with the most recent timestamp be used.

Figure 4:
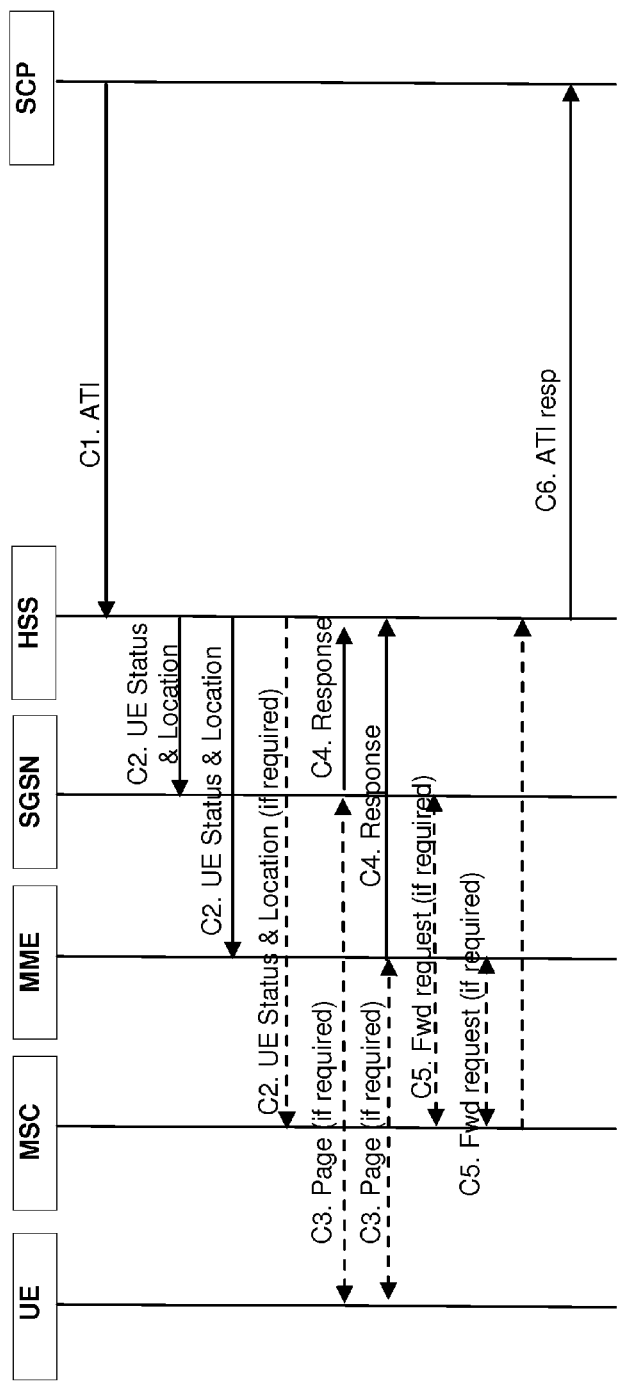
FIG. 4 illustrates an example signalling flow diagram of a method of obtaining user terminal location and status information according to an embodiment of the present invention.

FIG. 4 illustrates a simplified signalling flow diagram of a Service Control Point (SCP) requesting and receiving status and location information relating to a UE. The steps performed are as follows:

C1. An SCP (e.g. IM-SSF) sends a MAP ATI messages to the HSS requesting the status and location of a particular subscriber's UE. The request includes an identity of the subscriber.

C2. In this example, both a MME and an SGSN are registered at the HSS for the UE identified from the identity provided in the request. As such, the HSS sends a request for information to both the MME and the SGSN at which the UE is registered. The HSS may also send the request for status and location information to a Mobile Switching Centre (MSC) (as indicated by the dashed line).

C3. Upon receiving the request from the HSS, then both the MME and the SGSN will determine if the UE is an active or idle mode. If the UE is in active mode then the MME and the SGSN will determine the status and location information to be that received in the most recent update from the UE. However, if the UE is in idle mode then the MME and the SGSN will determine the status and location information according to one or more of the procedures outlined above. For example, the MME and/or the SGSN can wait to see if the UE will be activated and/or check the age of the most recent information they hold. Alternatively, or if neither of the other procedures are successful, then the MME and/or the SGSN can page the UE. If the MME and/or the SGSN do page the UE, then the UE will only respond to a page from the node associated with the radio access technology on which it is currently camped.

C4. Once the MME and the SGSN have attempted to determine the current status and location information for the UE, then each node will send a response to the HSS. The responses from the MME and the SGSN may also include a timestamp indicating the time at which the information was received from the UE together with an indication of the ISR status of the UE (i.e. is ISR activated or deactivated). If either the MME or the SGSN have unsuccessfully attempted to page the UE, then this node will respond by rejecting the request from the HSS.

C5. If the MSC has also received a request, and if the UE has a combined registration for both the CS and PS domains, then the MSC may forward request to SGSN and/or the MME in order to obtain the required information.

C6. If the HSS receives the requested information from either the MME or the SGSN, and not from both, then the HSS will send the received information to the AS. If the HSS receives the requested information from both the MME and SGSN, then the HSS can then apply some predefined logic in order to determine which information it should send in the response to the AS. Alternatively, the HSS can send both the information received from the MME and the information received from the SGSN to the SCP. The SCP would then apply some predefined logic in order to determine which set of information it should use.

According to this embodiment, as well as requesting the information from the MME and the SGSN, the HSS may also send the request for status information to a Mobile Switching Centre (MSC). In addition, if the UE has a combined registration for both the CS and PS domains, then the MSC may forward request to SGSN (over the Gs interface) and/or the MME (over the SGs interface), in parallel to the request sent from the HSS to these nodes. In order to implement this, the HSS will need to be provided with some logic to determine if the circumstances require that an MSC should also be contacted.

Figure 5:
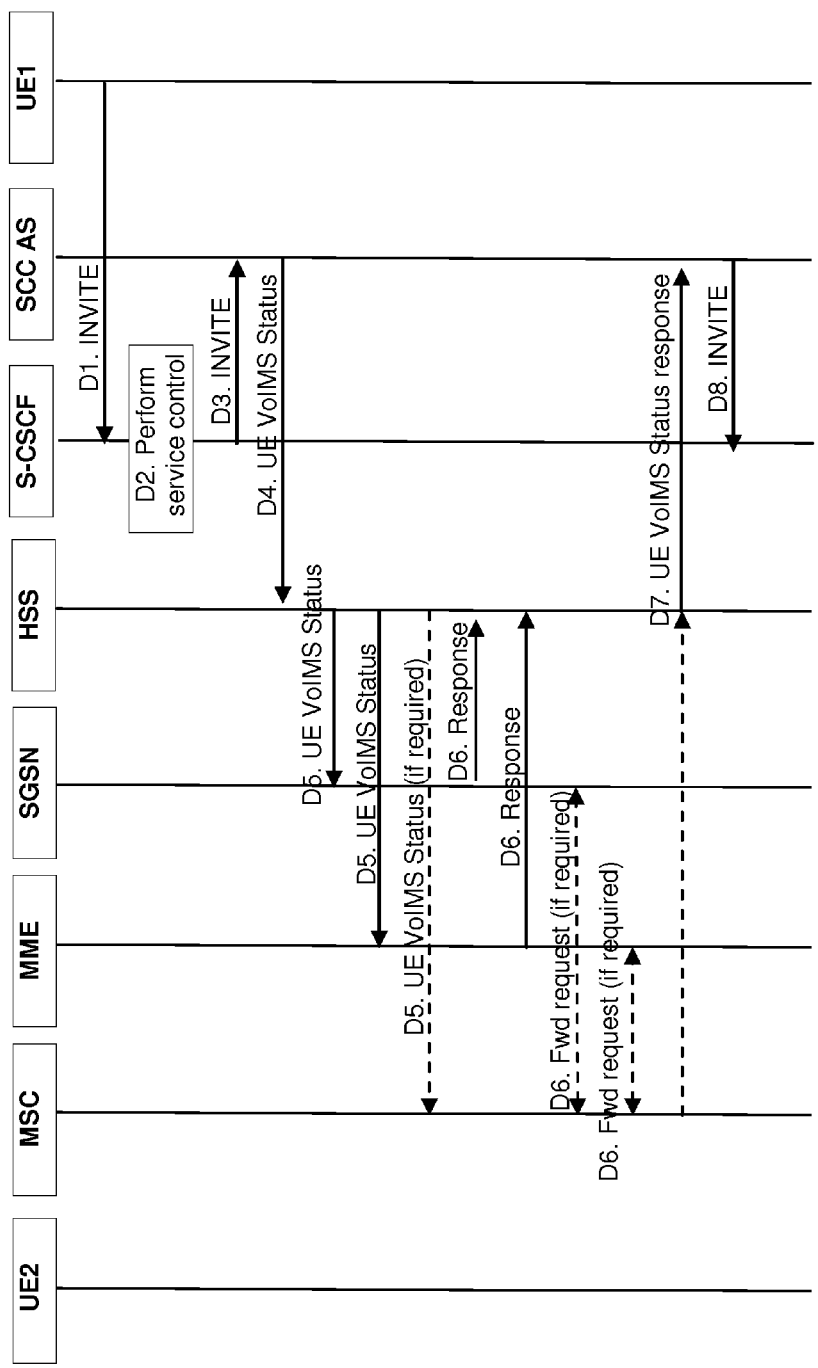
FIG. 5 illustrates an example signalling flow diagram of a Mobile Terminated voice call to a user terminal supporting VoIMS according to an embodiment of the present invention.

FIG. 5 illustrates a simplified signalling flow diagram of a Mobile Terminated voice call to a UE supporting Voice over IMS. The steps performed are as follows:

D1. A SIP INVITE is sent from an originating UE (UE1) towards the S-CSCF in the visited network of the terminating UE (UE2).

D2. The S-CSCF then performs service control for the terminating UE. The S-CSCF assesses the applicable initial Filter Criteria (iFC) and selects any ASs that should receive the INVITE. In this case the S-CSCF selects an SCC AS that provides support for the voice call.

D3. The S-CSCF routes the INVITE towards SCC AS. The session is then anchored in the SCC AS.

D4. The SCC AS sends a request to the HSS (over the Sh interface) for the VoIMS status of the terminating UE (i.e. are Voice over IMS services currently available for the UE). Optionally, the SCC AS can also request the ISR status of the terminating UE.

D5. In this example, both a MME and an SGSN are registered at the HSS for the UE identified from the identity provided in the request. As such, the HSS sends a message requesting the VoIMS status of the UE to both the MME and the SGSN at which the UE is registered. The message may also request the time of the last update received from the UE.

D6. Upon receiving the request from the HSS, then both the MME and the SGSN will determine if the latest update (i.e. RAU/TAU) received from the UE indicates that VoIMS is supported in the particular access network the UE is camped on. Both the MME and SGSN will also determine the time of the last update received from the UE. Once the MME and SGSN have determined whether VoIMS is supported for the UE, then each node will send a response to the HSS. The responses from the MME and the SGSN may also include a timestamp indicating the time at which the last update was received from the UE, depending upon whether this was requested by the HSS or whether the MME and SGSN are configured to provide a timestamp with any such information. The response may also include an indication of the ISR status of the UE (i.e. is ISR activated or deactivated).

D7. The HSS then sends the information received from both the MME and the information received from the SGSN to the SCC AS, together with any associated timestamp. Alternatively, the HSS can apply some predefined logic in order to determine which information it should send in the response to the AS. For example, the HSS could be configured to select and send only that information associated with the most recent timestamp.

D8. Depending upon the information received in the response from the HSS, the SCC AS will then determine whether the call to the terminating UE should continue in the PS access domain or in the CS access domain. If the call is to be routed to the terminating UE via the PS access, then the INVITE is forwarded to P-CSCF (via the S-CSCF) for further transmission to the PDN GW/GGSN and eventually to the terminating UE. If the call is to be routed to the terminating UE via the CS access, then the INVITE is forwarded to the MSC (via the S-CSCF and the BGCF if necessary). After that the call proceeds as normal for either an MMTel call or a CS call as appropriate.

Once again, in these circumstances the HSS may also send the request for status information and/or the Mobile Station Roaming Number (MSRN) to a Mobile Switching Centre (MSC), if this is requested by the SCC AS. This is useful in case any subsequently established call is directed towards the CS domain, and avoids the need for the SCC AS to send a further request to the HSS for the roaming number. In addition, if the UE has a combined registration for both the CS and PS domains, then the MSC may forward request to SGSN (over the Gs interface) and/or the MME (over the SGs interface), in parallel to the request sent from the HSS to these nodes. In order to implement this, the HSS will need to be provided with some logic to determine if an MSC should also be contacted.

The methods described above provide that an Application Server can obtain accurate status and location information for a UE from a HSS in an Evolved Packet Core network, even when the UE has a double registration to both a MME and an SGSN, and when the UE is in idle mode. In particular, these methods provide that the Evolved Packet Core network will support the ATI mechanism, the provision of the Cell ID for CDRs, and the T-ADS functionality for such UEs.

FIG. 6 illustrates schematically an example of a MME/SGSN 1 suitable for implementing the method described above. The MME/SGSN 1 can be implemented as a combination of computer hardware and software. The MME/SGSN 1 comprises a transmitter 2, receiver 3, a processor 4 and memory 5. The memory 5 stores the various programmes that are implemented by the processor 4, together with any required data such as the pre-defined time limits and thresholds and the most recent information received from the UE. These programmes include a determination unit 6, a message generator 7, a timer unit 8 and a paging unit 9. The transmitter 2 sends the response to the HSS, and sends any paging message to the UE. The receiver 3 receives the request for location and/or status information for the UE from the HSS, and receives any paging response from UE.

The determination unit 6 performs the steps necessary to determine the location and/or status information for the UE. The determination unit 6 determines if the MME/SGSN 1 should respond with the location and/or status information received in the most recent update from the UE, or whether further steps are required. If the determination unit 6 determines that further steps are required, then it will determine if the UE is in active mode or idle mode. If the UE is in active mode, then the determination unit 6 determines that the latest location and/or status information received from the UE should be used. However, if the UE is in idle mode, then the determination unit 6 determines if the MME/SGSN 1 should:

wait for activation of the UE in order to receive the location and/or status information;
use the most recent update of the UE's location and/or status information; or
generate a paging message for sending to the UE in order to obtain the location and/or status information.

If the determination unit 6 determines that the MME/SGSN 1 should use the most recent update of the UE's location and/or status information, then the determination unit 6 determines if the age of the location and/or status information held by the MME/SGSN 1 exceeds a specified threshold. If not, then the MME/SGSN 1 uses the more recent location and/or status information held for the UE in the memory 5.

If the determination unit 6 determines that the MME/SGSN 1 should wait for activation of the UE in order to receive the location and/or status information, then the timer unit 8 determines if the user terminal is activated within a specified time limit. If so, then the MME/SGSN 1 uses the location and/or status information from the activation of the UE.

If the determination unit 6 determines that the MME/SGSN 1 should generate a paging message for sending to the UE in order to obtain the location and/or status information, then the paging unit 9 generates the paging unit and processes the paging response from the UE.

The message generator 7 generates the response to the HSS, including the determined location and/or status information and possibly a timestamp for the information.

FIG. 7 illustrates schematically an example of a HSS 10 suitable for implementing the method described above. The HSS 10 can be implemented as a combination of computer hardware and software. The HSS 10 comprises a transmitter 11, receiver 12, a processor 13 and memory 14. The memory 14 stores the various programmes that are implemented by the processor 13, together with any required data. These programmes include a message generator 15 and a selection unit 16. The transmitter 11 sends the requests for information to the MME and SGSN, and sends the response to the AS. The receiver 3 receives the request for location and/or status information for the UE from the AS, and receives the responses from the MME and SGSN.

The message generator 15 generates the messages requesting location and/or status information that are sent to the MME and the SGSN. If required, the selection unit 16 applies the selection logic in order to determine if the information received from the MME or the information received from the SGSN should be sent to the AS.

FIG. 8 illustrates schematically an example of an AS 17 suitable for implementing the method described above. The AS 17 can be implemented as a combination of computer hardware and software. The AS 17 comprises a transmitter 18, receiver 19, a processor 20 and memory 21. The memory 21 stores the various programmes that are implemented by the processor 20, together with any required data. These programmes include a message generator 22 and a selection unit 23. The transmitter 18 sends the request for location and/or status information for a UE to the HSS. The receiver 19 receives the response from the HSS, including the location and/or status information received from the MME and/or SGSN.

The message generator 22 generates the message requesting location and/or status information that is sent to the HSS. If required, the selection unit 23 applies the selection logic in order to determine if the information received from the MME or the information received from the SGSN should be used by the AS 17.

It will be appreciated by the person of skill in the art that various modifications may be made to the above-described embodiments without departing from the scope of the present invention. For example, whilst the above embodiments relate to scenarios in which specific application servers require specific information relating to a user terminal with a double registration, it should be understood that the methods and apparatus described above are equally applicable to any other network nodes and other types of information that can be provided by mobility management nodes such as the MME and SGSN.

The invention claimed is:

1. A method of operating a Home Subscriber Server (HSS) to obtain location and/or status information for a user terminal connected to an Evolved Packet Core network, the user terminal being registered with the HSS at a first mobility management node in a first radio access technology and a second mobility management node in a second radio access technology, the method comprising:
receiving a request for location and/or status information for the user terminal from an application server;
sending a request for location and/or status information for the user terminal to both the first mobility management node and the second mobility management node;
receiving a response from the first mobility management node and/or the second mobility management node, the responses including the requested information; and
sending the requested information received from the first mobility management node and/or the second mobility management node to the application server.

2. The method as claimed in claim 1, further comprising:
if the requested information is received from both the first mobility management node and the second mobility management node, applying selection logic to determine if the information received from the first mobility management node or the information received from the second mobility management node should be sent to the application server; and
sending only the selected information to the application server.

3. The method as claimed in claim 2, wherein if the requested information includes an indication of the time of or the time since the last update from the user terminal, then the selection logic comprises selecting the most recent information.

4. The method as claimed in claim 1, wherein the location and/or status information comprises one or more of:
an identifier for the cell or service area in which the user terminal is located;
an indication of whether or not Voice over IP services are available for the user terminal;

an indication of whether the user terminal is idle or active; and an indication of whether or not idle signalling mode reduction is activate for the user terminal.

5. The method as claimed in claim 1, wherein the application server comprises one of:
   an IP Multimedia Subsystem Charging application server;
   a Service Control Point;
   a Service Centralization and Continuity application server; and
   a Gateway Mobile Location Centre.

6. A method of operating an application server to determine the location and/or status information for a user terminal connected to an Evolved Packet Core network, the method comprising:
   sending, by the application server, a request for location and/or status information for a user terminal to a Home Subscriber Server (HSS);
   receiving, at the application server, a response from the HSS, the response including a first set of location and/or status information and a second set of location and/or status information; and
   applying selection logic to determine which of the first set and second set should be used.

7. The method as claimed in claim 6, wherein if the first and second sets of location and/or status information both include an indication of the age of the information, then the selection logic comprises selecting the most recent information.

8. The method as claimed in claim 6, wherein the user terminal is registered with a first mobility management node in a first radio access technology and a second mobility management node in a second radio access technology, and the first set was retrieved from the first mobility management node and the second set was retrieved from the second mobility management node.

9. The method as claimed in any claim 6, wherein the application server comprises one of:
   an IP Multimedia Subsystem Charging application server;
   a Service Control Point;
   a Service Centralization and Continuity application server; and
   a Gateway Mobile location Centre.

10. A Home Subscriber Server (HSS) apparatus for obtaining location and/or status information for a user terminal connected to an Evolved Packet Core Network, the user terminal being registered with the HSS at a first mobility management node in a first radio access technology and a second mobility management node in a second radio access technology, the apparatus comprising:
    a processor for generating a first message for sending to the first mobility management node and a second message for sending to the second mobility management node, the first and second messages requesting location and/or status information for the user terminal;
    a transmitter for sending the first message to the first mobility management node and the second message to the second mobility management node; and
    a receiver for receiving a response from the first mobility management node and/or the second mobility management node, the responses including the requested information, wherein
    the processor is configured to employ a transmitter to send the requested information received from the first mobility management node and/or the second mobility management node to an application server requesting the requested information.

11. The apparatus as claimed in claim 10, wherein, if the requested information is received from both the first mobility management node and the second mobility management node, the processor is further configured to:
    apply selection logic to determine if the information received from the first mobility management node or the information received from the second mobility management node should be sent to the application server.

12. An application server apparatus for determining the location and/or status information for a user terminal connected to an Evolved Packet Core Network, the apparatus comprising:
    a transmitter for sending a request for location and/or status information for a user terminal to a Home Subscriber Server (HSS);
    a receiver for receiving a response from the HSS, the response including a first set of location and/or status information and a second set of location and/or status information; and
    a processor for applying selection logic to determine which of the first set and second set should be used.

13. The apparatus as claimed in claim 12, wherein if the first and second sets of location and/or status information both include an indication of the age of the information, then the selection logic comprises selecting the most recent information.

14. The method of claim 1, wherein
    the step of receiving a request for location and/or status information for the user erminal from an application server is performed by the HSS, and
    the step of sending a request for location and/or status information for the user terminal to both the first mobility management node and the second mobility management node is also performed by the HSS.

15. The method of claim 14, wherein receiving a request for location and/or status information for the user terminal from an application server comprises the HSS receiving from the application server a request for a cell identifier that identifies the cell in which the user terminal is currently camped.

* * * * *